No. 741,169. PATENTED OCT. 13, 1903.
E. C. SACHSE.
MOLD FOR MAKING FIRE KINDLERS.
APPLICATION FILED JUNE 3, 1902. RENEWED FEB. 13, 1903.
NO MODEL.
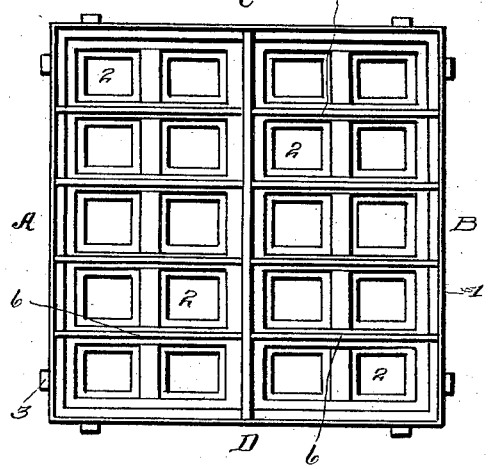
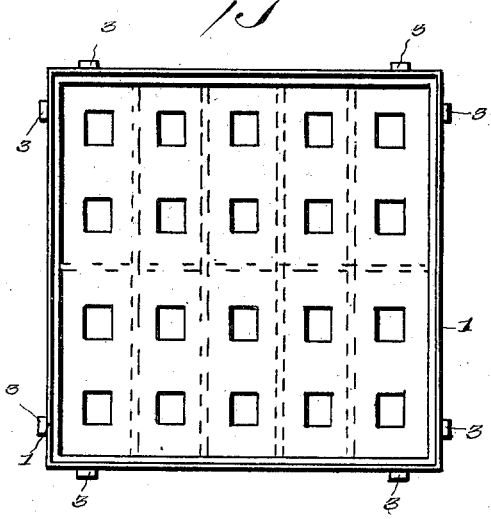
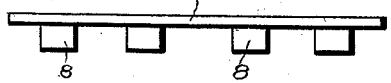
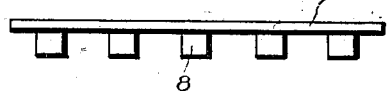
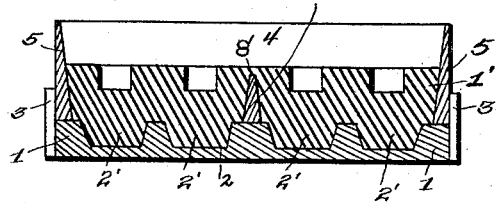
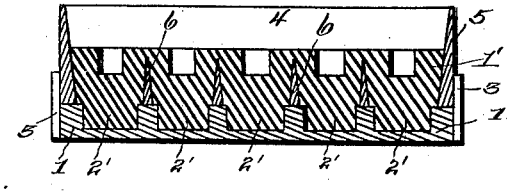
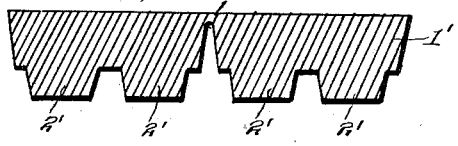
WITNESSES:
R. A. Boswell.
K. E. Pritchett,
INVENTOR
Ernest C. Sachse No. 741,169.

Patented October 13, 1903.

UNITED STATES PATENT OFFICE.

ERNEST C. SACHSE, OF ST. LOUIS, MISSOURI.

MOLD FOR MAKING FIRE-KINDLERS.

SPECIFICATION forming part of Letters Patent No. 741,169, dated October 13, 1903.

Application filed June 3, 1902. Renewed February 13, 1903. Serial No. 143,266. (No model.)

*To all whom it may concern:*

Be it known that I, ERNEST C. SACHSE, a citizen of the United States, residing at St. Louis, in the State of Missouri, have invented certain new and useful Improvements in Molds for Making Fire-Kindlers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in molds, and relates more specifically to improvements in molds adapted to be employed in connection with the production and making of fire-kindler for use in starting of fires in grates, furnaces, or the like.

My invention has for its object to construct a mold in which a plurality of cakes or blocks of fire-kindler may be formed at the same time, each cake or block being molded with feet or projections on the lower face which serve to support the cake or block when the same is placed on the grate-bars in order that the fire may have ready access in, under, and around the cake or block of kindler.

In connection with this invention I have filed an application for the improved process of manufacture and for the article produced by the process, the improved form of mold shown and described in this application being preferably employed in connection with my process of producing the kindler.

Briefly described, the present application consists of a mold which is divided into a plurality or series of compartments, the mold being formed in three parts—a base or bottom plate, a grating, and a presser-plate adapted to fit in the grating and to which the pressure is applied for forcing the mixture of which the kindler is composed into the compartments and solidifying same to form it into cakes or blocks, as will be more fully described.

In describing the invention in detail reference will be had to the accompanying drawings, forming a part of this specification, and wherein like numerals of reference will be employed for indicating like parts throughout the several views of the drawings, in which—

Figure 1 is a top plan view of my improved mold. Fig. 2 is a transverse vertical sectional view taken on the line A B of Fig. 1. Fig. 3 is a longitudinal sectional view taken on the line C D of Fig. 1. Fig. 4 is a top plan view showing the kindler therein. Fig. 5 is an edge view of the presser-plate employed for solidifying the kindler in the mold. Fig. 6 is a side view of the same, and Fig. 7 is a sectional view showing the cakes or blocks of kindler as they are formed in the mold.

To put my invention into practice, I preferably construct the mold with a plurality of compartments, into which the kindler is pressed. This improved mold consists of three separate parts, the base or bottom plate 1 of the mold being constructed, preferably, very heavy, so as to withstand the pressure to which it is subject in carrying out my improved process of producing the kindler. This base or bottom plate 1 is provided in its upper face with a series of depressions 2, which are formed by recessing the mold-base or bottom-plate in its upper face. These depressions or recesses in the upper face of the base or bottom plate receive the mixture from which the kindler is produced and form feet or projections 2' on the underneath face of the cake or blocks 1', as shown in Fig. 7 of the drawings, these feet or projections acting to support the body of the cake or block above the grate in order that the fire may have free access thereto. This base or bottom plate of the mold is constructed with guides or lugs 3, which in practice are preferably cast integral with the base. These guides or lugs 3 serve to guide the upper or intermediate member of the mold, which consists of a grating 4, embodying the outer wall 5 and the intermediate walls 6, serving to provide a series or plurality of compartments, in each of which a cake or block of the kindler is formed. Each compartment in the grating is placed when the sections or members are together above the recesses or depressions in the bottom plate, whereby the material of which the kindler is formed will fall into the openings 2. The prepared material of which the kindler is formed is placed in the compartments after the grating and the base have been placed together as described, and in the process of manufacture the material is then subjected to the action of a press. In order that an equal pressure may be given to the material in the several compartments of the mold, I employ a presser-plate 7, which forms the third member or section of my improved mold. This presser-plate is provided with lugs or projections on its underneath face, which are of a height equal to the depth of the openings or depressions 2 in the base or bottom plate 1, and these lugs or projections 8 project into the several compartments of the grating or intermediate member 4, and when pressure is applied to the plate 7 they serve to force the material into the depressions to form the supporting-feet on the product and impart to the portion of the mixture forming these feet the same solidity as the balance of the cake or block. When thus subjected to pressure, a thin layer, as at 8', will hold the several cakes or blocks together within the mold and after they are taken out of the grating, this layer, however, being so thin that the cakes or blocks may be readily separated, if desired, yet at the same time holding the several cakes together under careful handling.

It will be evident that the base or bottom plate of the mold may be so constructed as to form a plurality of supporting-feet on each cake of the kindler, and the depressions in this bottom plate or base, as well as the shape of the compartments, may be of any desired style or shape. It will also be evident that in the construction of the mold various changes may be made in the details of construction without departing from the general spirit of my invention.

Having fully described my invention, what I claim as new, and desire to secure by Letters Patent, is—

1. A mold comprising a base or bottom plate having a series of depressions in its upper face, a grating having a series of walls dividing the same into compartments, and a presser-plate provided on its underneath face with lugs or projections, as and for the purpose described.

2. In a mold, a base or bottom plate provided in its upper face with depressions or recesses, guide-lugs carried by said base or bottom plate, and a grating divided by walls into a series of compartments registering with the depressions or recesses in the base or bottom plate, substantially as described.

In testimony whereof I affix my signature in presence of two witnesses.

ERNEST C. SACHSE.

Witnesses:
RUDOLF HOPFF,
WM. C. BOLM.